R. A. REYNOLDS.
INTERNAL COMBUSTION ENGINE.
APPLICATION FILED JAN. 13, 1909.

1,002,756.

Patented Sept. 5, 1911.

3 SHEETS—SHEET 1.

Witnesses
C. E. Hay
A. Townsend

Inventor
Robert A. Reynolds
By Parker & Burton
Attorneys

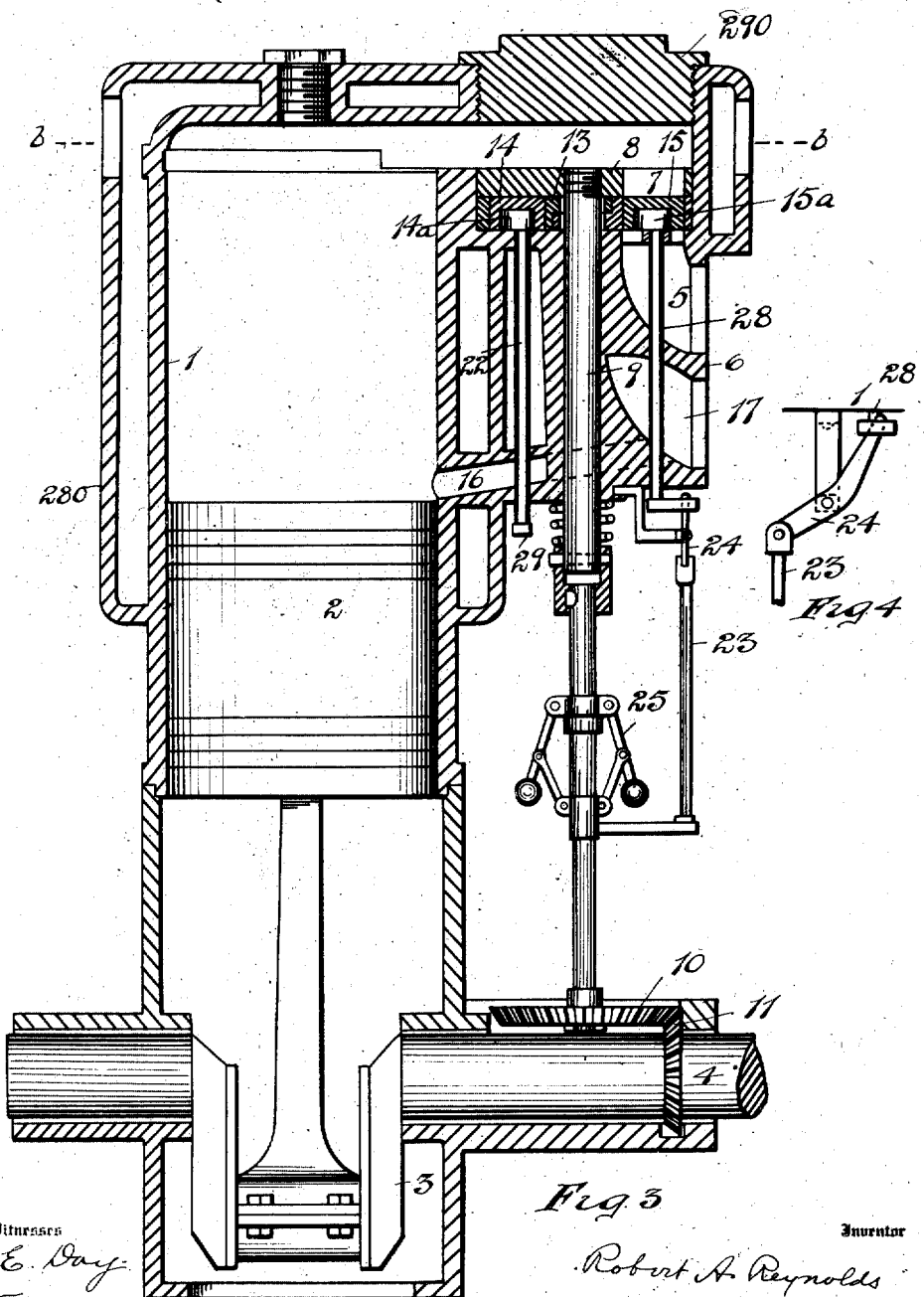

R. A. REYNOLDS.
INTERNAL COMBUSTION ENGINE.
APPLICATION FILED JAN. 13, 1909.
1,002,756.
Patented Sept. 5, 1911.
3 SHEETS—SHEET 3.
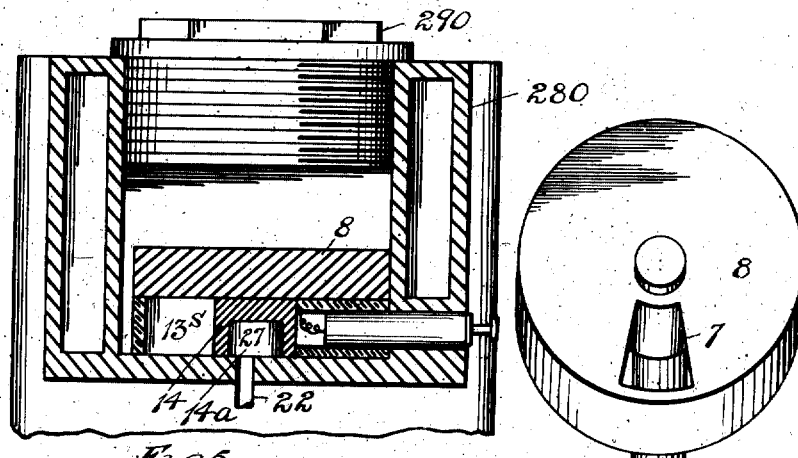
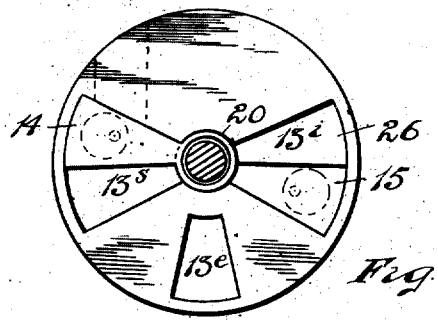
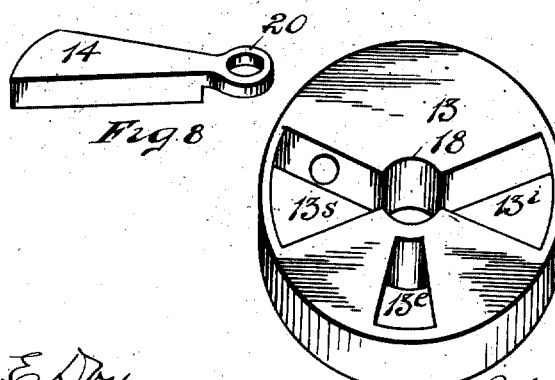
Witnesses
Clarence E. Day
A. Townsend.
Inventor
Robert A. Reynolds
Parker & Burton
Attorneys

UNITED STATES PATENT OFFICE.

ROBERT A. REYNOLDS, OF DETROIT, MICHIGAN.

INTERNAL-COMBUSTION ENGINE.

1,002,756.  Specification of Letters Patent.  Patented Sept. 5, 1911.

Application filed January 13, 1909. Serial No. 472,007.

*To all whom it may concern:*

Be it known that I, ROBERT A. REYNOLDS, a citizen of the United States, residing at Detroit, county of Wayne, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

This invention relates to internal combustion engines.

It has for its object an improved engine having a reciprocating piston and a rotating valve, with means for regulating the ignition apparatus, and means for regulating the flow of the fuel into the combustion chamber of the engine.

Figure 2:
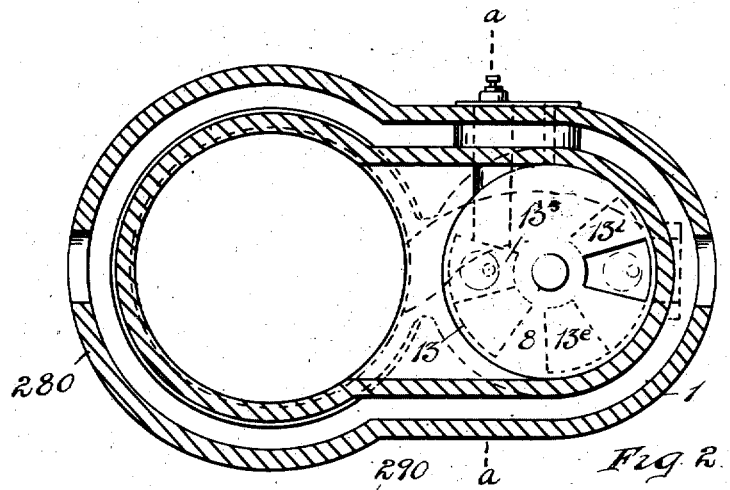
Figure 1:
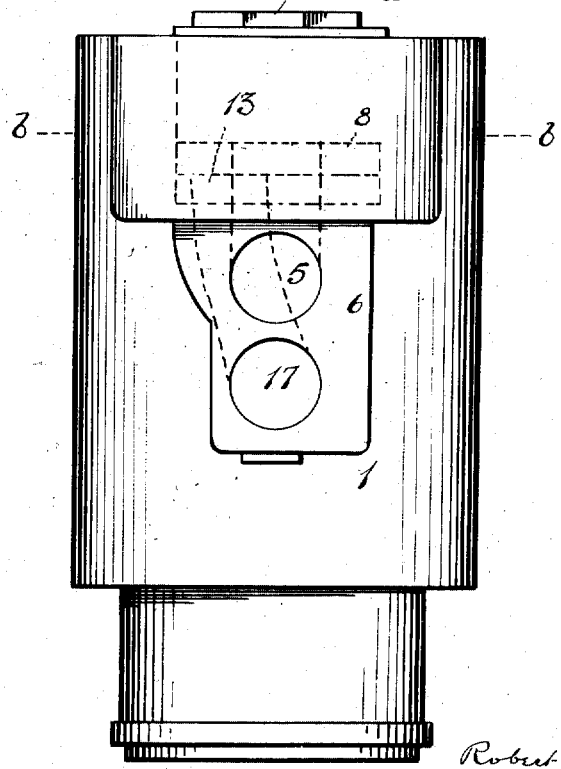

In the drawings:—Figure 1, is an elevation, showing a side view of the valve casing, and that portion of the cylinder which lies below the valve case. Fig. 2, is a cross section at the line $b$—$b$, Fig. 1. This also corresponds to a cross section at the line $b$—$b$, Fig. 3. Fig. 3, is a section taken along the axis of the cylinder, and along the axis of the valve stem. Fig. 4, is a detail of a part of the connection between the throttle and the governor. Fig. 5, is a cross section through the valve and its casing, on the line $a$—$a$ of Fig. 2. Fig. 6, is a perspective of the valve removed from its case. Fig. 7, is a plan of the valve seat removed from the case. Fig. 8, is a perspective of a throttle valve used in the valve seat. Fig. 9, is a perspective view of the valve, with the throttling and ignition regulating devices removed.

1 indicates the engine cylinder, in which engages a reciprocating piston 2, which drives crank 3 and shaft 4. The fuel or explosive compound is admitted into the cylinder 1 from its source of supply through an intake passage 5 that leads into the valve casing 6, through a seat of the valve, and through a port 7 in the valve disk 8. The valve disk 8 is mounted on a valve stem 9, which is driven in rotation by miter gear 10 on the stem, and gear 11 on the shaft 4. For a four cycle engine the miter gears 11 and 10 bear the proportion of one and two. In the valve casing, directly underneath the valve disk 8, is a valve seat member 13, pierced with three ports, or three openings, the intake port $13^i$, the exhaust port $13^e$ and the ignition port $13^s$. The exhaust port $13^e$ remains of unvarying capactiy. The intake port $13^i$ is provided with a throttle wing 15, and the ignition port $13^e$ is provided with a wing 14, similar to the throttling wing 15, which is used to advance or retard the time of ignition of the charge. The rotating valve 8 rotates to cover successively and uncover successively the several openings or ports named, and when the openings 7 through the rotating valve 8 engages over the opening $13^i$, which is a continuation of the intake passage 5, the explosive fuel passes into the valve chamber and thence into the combustion chamber behind the piston 2. After the explosion, and after the piston has been driven to the full extent of its throw, the burned products of combustion pass out through the primary exhaust 16, into the exhaust pipe 17, such part of them as remain in the combustion chamber are lifted and driven out through the valve chamber, and through the same passage 7, which now registers with the exhaust opening $13^e$. At the proper time, in the rotation of the valve, the opening 7 engages over the spark chamber $13^s$ in the seat, uncovers the ignition plug, whose ignition terminal is located in this chamber $13^s$, and the fuel is ignited primarily in this chamber, and the fire spreads into the cylinder 1. Between the throat opening 18 in the seat disk 13 and the stem 9 of the valve, is an annular chamber in which engages the ring terminal 20 of the throttling valve 14, or the ring terminal of the similar valve 14, which regulates and times the ignition. On the under side of the wing valve 15 is a cavity in which engages an eccentric cam $15^a$, mounted on the end of an oscillatory shaft 28, which is oscillated by a link 23, and by crank lever 24; of these, the link 23 is actuated by a centrifugal governor 25, of any approved character, mounted to rotate with the valve stem 9. The varying rotation of the governor shifts the valve 15, and varies the intake capacity of the port, regulating the size of the opening 26. The wing valve 15 rests on the cross web of the valve casing which prevents the formation of a passage behind the wing valve. The valve 14 is regulated by a similar cam $14^a$ actuated by a stem 22, and a hand lever 29, by means of which the stem is turned and the ignition action advanced or retarded, as may be desired. The ignition is preferably produced by a hot wire (heated by an electric current) in preference to the usual jump spark method. The cylinder is surrounded with an ordinary water jacket 28º, and the upper opening into the valve casing is closed by a plug 29º, through which opening the valves themselves may be inserted; and the necessary tooling for their accurate seating may be effected.

The ignition plug is inserted through the valve casing, and the ignition terminal 27 thereof, leads into the opening 13ˣ. As shown in Fig. 5, the wing valve is shown in position to entirely prevent the ignition.

What I claim is:—

1. In an internal combustion engine, in combination with a cylinder having an auxiliary exhaust port controlled by the piston and a valve seat provided with an inlet port, an ignition chamber provided with constant means of ignition, and a main exhaust port, a rotating valve connecting the cylinder successively with the inlet port, ignition chamber and exhaust port of the valve seat, a throttling valve for said inlet port, ignition advancing or retarding valve for said ignition chamber, and separate means for actuating each of said valves, substantially as described.

2. In an internal combustion engine, the combination of a valve seat having a port, a valve adapted to cover and uncover said port, a stem by which said valve is connected to its actuating means, an auxiliary valve pivoted to the valve stem and adapted to swing across said port, and separate means for actuating each valve.

3. In an internal combustion engine, the combination of a valve adapted to operate a plurality of ports, a valve seat having a plurality of ports, throttling means located at said seat, means for actuating said valve and means for controlling said throttling means.

4. In an internal combustion engine, in combination with a valve seat having a plurality of ports, a valve adapted to operate said ports, constant means of ignition in one of said ports, means for advancing said ignition, means for actuating said valve and means for controlling said advancing means.

5. In an internal combustion engine, a valve seat having an inlet and outlet port, a valve stem between said ports, a valve mounted on said stem and adapted to alternately connect said ports with the combustion chamber, a throttle valve pivoted to said stem and adapted to swing across the inlet port and separate means for actuating each of said valves.

6. In an internal combustion engine, a valve seat having an inlet port, an outlet port, and an ignition chamber arranged about the center, a valve stem engaging through said center, a valve mounted on said stem and adapted to successively connect said ports and said ignition chamber with the combustion chamber, an advancing member pivoted to said stem and adapted to swing across said ignition chamber, separate means for actuating said valve and advancing member.

7. In an internal combustion engine, a valve seat having an inlet port, an outlet port and an ignition chamber arranged about a center, a valve stem engaging through said center, a valve mounted on said stem and adapted to successively connect said ports with the combustion chamber, a throttle valve pivoted to said stem and adapted to swing across the inlet port, an advancing member pivoted to said stem and adapted to swing across the ignition chamber, and separate means for actuating each of said valves and said advancing member.

8. In an internal combustion engine, a valve seat having an inlet port and an ignition chamber, a valve stem between said port and chamber, a valve mounted on said stem and adapted to alternately connect said port and ignition chamber with the combustion chamber, a throttle valve pivoted to said stem and adapted to swing across the inlet port, and separate means for actuating each valve.

9. In an internal combustion engine, a valve seat having an inlet port and an ignition chamber, a valve stem between said port and chamber, a valve mounted on said stem and adapted to alternately connect said port and chamber with the combustion chamber, an advancing member pivoted to said stem and adapted to swing across said ignition chamber, and separate means for actuating the valve and the advancing member.

10. In an internal combustion engine, a valve seat having an inlet port and an ignition chamber, a valve stem between said port and chamber, a valve mounted on said stem and adapted to alternately connect said port and chamber with the combustion chamber, a throttle valve pivoted to said stem and adapted to swing across the inlet port, an advancing member pivoted to said stem and adapted to swing across said ignition chamber, and separate means for actuating each valve and the advancing member.

In testimony whereof, I sign this specification in the presence of two witnesses.

ROBERT A. REYNOLDS.

Witnesses:
 CHARLES F. BURTON,
 VIRGINIA C. SPRATT.